United States Patent
Rouvari

(10) Patent No.: US 6,701,260 B1
(45) Date of Patent: Mar. 2, 2004

(54) SYSTEM FOR MEASURING LOADINGS IN A STRUCTURE, MEASURING UNIT AND MEASURING SENSOR

(75) Inventor: Risto Sakari Rouvari, Helsinki (FI)

(73) Assignee: R. Rouvari Oy (FI)

( * ) Notice: Subject to any disclaimer, the term of this patent is extended or adjusted under 35 U.S.C. 154(b) by 53 days.

(21) Appl. No.: 10/009,377

(22) PCT Filed: Jun. 2, 2000

(86) PCT No.: PCT/FI00/00492

§ 371 (c)(1),
(2), (4) Date: Dec. 3, 2001

(87) PCT Pub. No.: WO00/75605

PCT Pub. Date: Dec. 14, 2000

(30) Foreign Application Priority Data

Jun. 3, 1999 (FI) .................................................. 991270

(51) Int. Cl.[7] ................................................ G01L 1/00
(52) U.S. Cl. ..................... 702/43; 702/42; 73/862.636; 73/862.629
(58) Field of Search ................ 702/42, 43; 73/862.636, 73/862.629

(56) References Cited

U.S. PATENT DOCUMENTS

| | | | | |
|---|---|---|---|---|
| 3,853,000 A | * | 12/1974 | Barnett et al. ................. | 73/763 |
| 4,064,744 A | * | 12/1977 | Kistler ......................... | 73/766 |
| 4,336,595 A | * | 6/1982 | Adams et al. ................ | 702/34 |
| 4,522,072 A | | 6/1985 | Sulouff et al. ................ | 73/765 |
| 4,764,882 A | * | 8/1988 | Braschel et al. .............. | 702/42 |
| 4,831,558 A | * | 5/1989 | Shoup et al. ................ | 702/188 |
| 5,327,791 A | | 7/1994 | Walker ................... | 73/862.628 |
| 5,512,713 A | * | 4/1996 | Naito et al. ................. | 177/211 |
| 5,522,270 A | | 6/1996 | Gissinger et al. ....... | 73/862.627 |
| 5,606,515 A | * | 2/1997 | Mockapetris et al. ....... | 702/106 |
| 5,656,882 A | * | 8/1997 | Lazarus et al. ............. | 310/328 |
| 5,734,110 A | | 3/1998 | Kosmal ........................ | 73/766 |
| 5,754,122 A | * | 5/1998 | Li et al. ................. | 340/870.11 |
| 5,847,668 A | * | 12/1998 | Morita et al. ............... | 341/132 |
| 5,962,792 A | * | 10/1999 | Kimerer, Jr. ................. | 73/772 |

FOREIGN PATENT DOCUMENTS

| | | |
|---|---|---|
| FI | WO 97/10486 | 3/1997 |
| GB | 1 456 403 | 11/1976 |
| IT | 0 845 657 A3 | 3/1999 |
| JP | 0 616 199 A3 | 9/1994 |

* cited by examiner

Primary Examiner—John Barlow
Assistant Examiner—Anthony Dougherty
(74) Attorney, Agent, or Firm—Thorpe North & Western LLP

(57) ABSTRACT

The invention relates to a system for measuring loading, stresses and/or material fatigue in a structure. The invention also relates to a measuring sensor unit (50) and a measuring sensor (302) suitable for use in connection with said method. The invention is applicable especially to the measurement of stresses and loading on a ship hull. One inventive idea is that the measuring sensor unit (50) of the measuring system comprises means (310) for processing a signal from the sensor so as to allow complete mathematical measuring results to be transmitted (316, 21) from the measuring sensor unit to the central processing unit. Another inventive idea is to form a measuring sensor from the sensor assembly and the strain gauge so that deformations are transmitted to the strain gauge attached to an elastic area of the sensor assembly. By means of the invention, the measuring units can be calibrated apart from the structure material and additional measuring units can be provided in the system whenever necessary.

7 Claims, 3 Drawing Sheets

SYSTEM FOR MEASURING LOADINGS IN A STRUCTURE, MEASURING UNIT AND MEASURING SENSOR

The invention relates to a system for measuring loading, stresses and/or material fatigues occurring in a structure. The invention also relates to a measuring unit and a measuring sensor suitable for use in connection with said system. The invention is applicable especially to the measurement of stresses and loading in a ship hull.

Load exerted on a ship hull must be continuously measured for any changes taking place in the structure, such as material fatigue, to be detected before the structures break. Similar measurements are performed regarding other structures, such as other vehicles, bridges and buildings.

Figure 1:
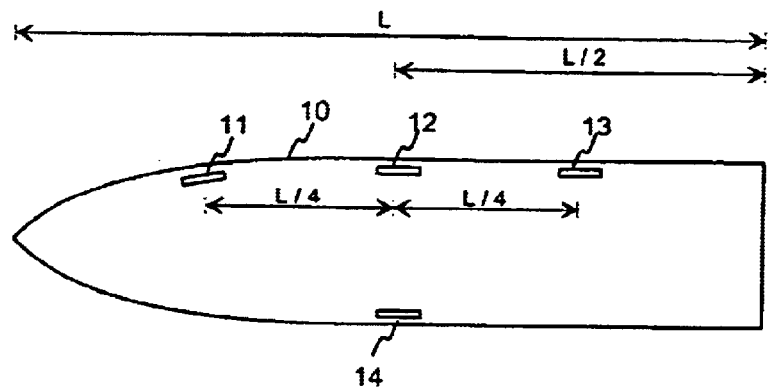

There are conventional methods comprising the fastening of measuring sensors to a ship hull to measure local deformations of the structure. FIG. 1 shows a top view of the main deck 10 of a ship hull and the typical positioning of measuring sensors 11, 12, 13 and 14 on the main deck of the ship hull. Typically used measuring sensors are steel bars with an approximate length of 1–2 meters, which are solidly attached e.g. by welding to the main deck of the ship hull, with one end of the bar stationary and the other end axially movable. At the junction, e.g,. a movement sensor is disposed to measure the mutual movement. The bar of the measuring sensors shall have a length at least equal to the length mentioned above for the relative movements of the bars to be sufficiently large (typically a maximum of +/−5 mm) and the deformation measurement to be sufficiently accurate.

In conventional methods, the weak signal obtained from the measuring sensors is conducted to the central unit of the measuring system, where the signals received from the sensors are amplified and converted into digital form, and mathematical signal processing is performed. There are different standard signal processing models to allow optimally reliable detection of critical deformations by means of measurement results. Such models are i.a. the frequency range analysis and the so-called Rainflow classification. The Rainflow classification is defined i.a. in ASTM Standard E1049–85 (Reapproved 1990).

The prior art systems mentioned above involve some drawbacks. Firstly, the systems have been devised for a given number of standard measuring sensors, so that additional measuring sensors cannot be provided if necessary. This is due to the fact that the computing capacity of the central processing unit of the system and the interfaces have been dimensioned for a predetermined number of measuring sensors. There are situations where the usual number of measuring sensors will not be sufficient, such as for instance in a catamaran ship, where a considerable greater number of measuring sensors, e.g. 60 units, might be necessary, compared with a "conventional" ship hull, where there are usually e.g. 4 measuring sensors.

Secondly, prior art systems involve the problem of interference connected to the long measuring lines between the measuring sensors and the central processing unit. This is difficult to avoid by protecting the measuring cables, because the signals to be transmitted from the measuring sensors are low-frequency analogue signals.

In addition, prior art measuring sensors also involve the problem of onerous calibration. On reason for this is the cumbersome detachment of large measuring sensors from the ship hull, and another reason is that a large-sized measuring sensor may behave differently when attached to a ship hull than under calibration conditions. Consequently, accurate and reliable calibration will be difficult to achieve. The replacement of a defective measuring sensor is also awkward.

The object of the present invention is to avoid the prior art problems mentioned above with the aid of a new measuring solution.

One inventive idea is that the measuring sensor unit, i.e. measuring unit of a measuring system, comprises means for processing a signal obtained from the sensor so that complete mathematical measurement results can be transmitted from the measuring unit to the central processing unit. In this manner, no large computing power will be required in the central processing unit, nor does this capacity requirement depend substantially on the number of measuring sensors used. Thus the number of measuring sensors can be readily increased. In addition, the negative impact of interference connected to the cable between the measuring unit and the central processing unit will be small, because the signals to be transmitted are digital and the transmission can be repeated if necessary.

A second inventive idea is that the measuring sensor has mechanical features allowing it to be readily attached to and detached from the structure to be measured. In this case, the structure to be measured preferably includes a base for attachment of the measuring sensor. The measuring sensor can then be calibrated apart from the structure to be measured and the behaviour of the measuring sensor will be exactly the same in the structure to be measured as under calibrating conditions.

A further inventive idea is to form a measuring sensor from a sensor assembly and a strain gauge so that deformations are transmitted to the strain gauge, which is attached to an elastic area in the sensor assembly. The elastic area is preferably formed with a double H -opening in the sensor assembly. In addition, the sensor preferably comprises a second strain gauge for temperature calibration, which is attached to a part of the sensor assembly where no deformation occurs. In this manner, a small-sized but high-precision measuring sensor will be provided, which is easy to handle e.g. during calibration.

The system of the invention for measuring loading on a structure, which comprises a central processing unit and at least one measuring unit, is characterised by the measuring unit comprising a measuring sensor for converting structure deformations into an electric signal, means for converting said signal into a digital signal, means for mathematical processing of the digital signal, and means for transmitting the processing results to the central processing unit, the central processing unit comprising means for receiving and collecting processing results transmitted from at least one measuring unit.

The measuring sensor of the invention for measuring loading on a structure is characterised by the fact that the measuring sensor comprises a sensor assembly, which is attached to the structure to be measured and includes two rigid members for attachment to the structure to be measured and an elastic member between these, a first strain gauge having been fastened to said elastic member for transmitting deformations of the structure and the sensor assembly to the strain gauge with a view to generate a signal proportional to the deformations of the strain gauge.

The measuring unit of the invention for measuring loading on a structure is characterised by the fact that the measuring unit comprises a measuring sensor for converting deformations of a structure into an electric signal, means for converting said signal into a digital signal, means for mathematical processing of the digital signal, and means for transmitting the processing results to the central processing unit. Preferred embodiments of the invention are described in the dependent claims.

Figure 2:
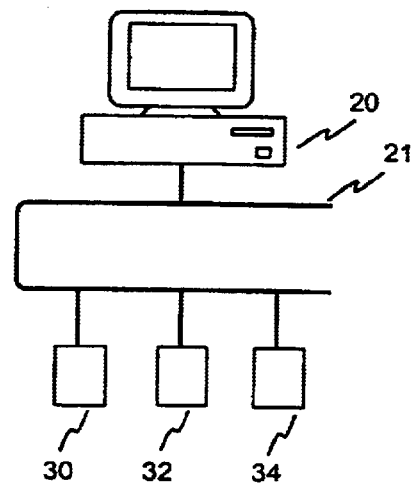
Figure 3:
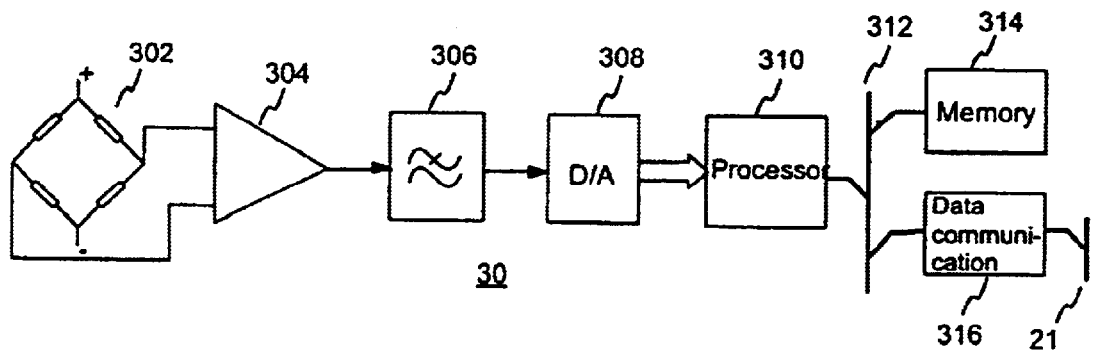
Figure 4:
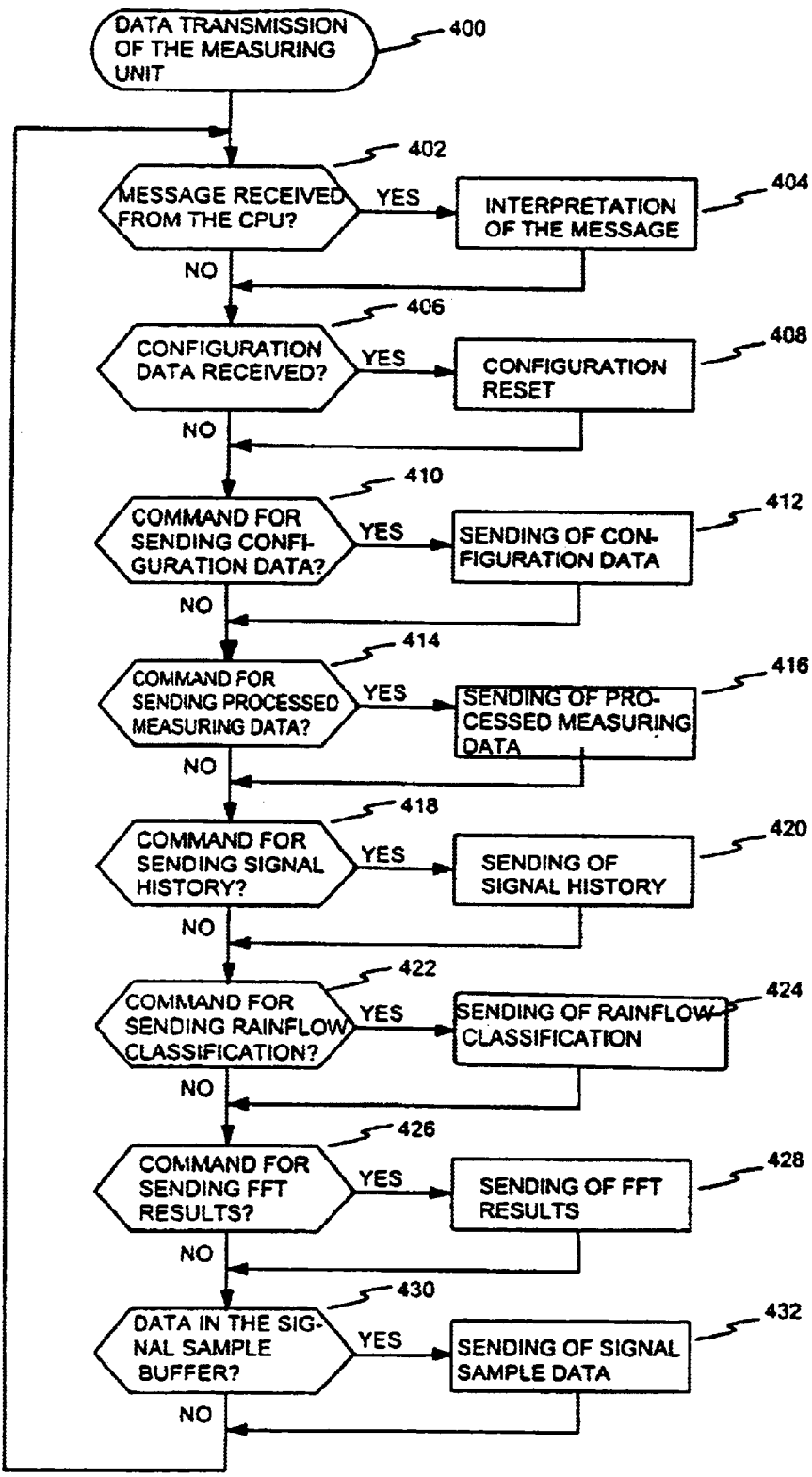
Figure 5A:
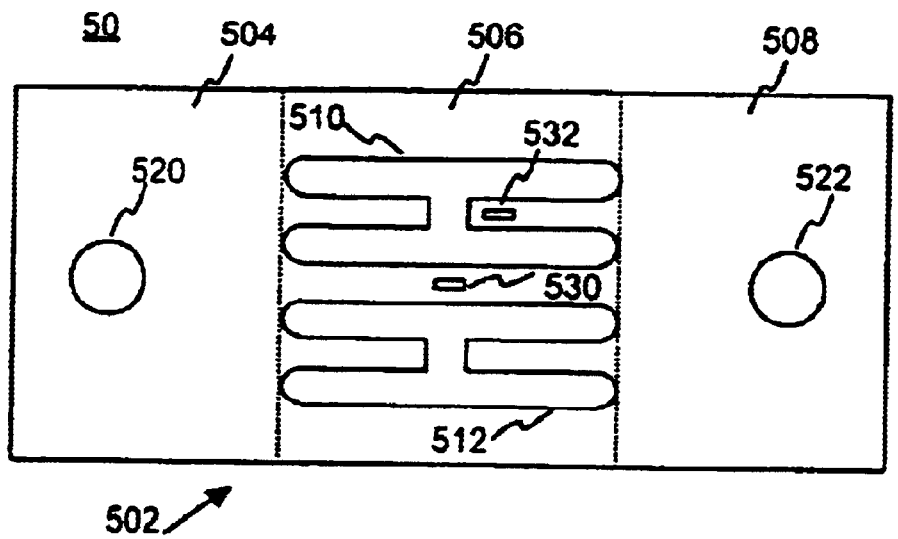
Figure 5B:
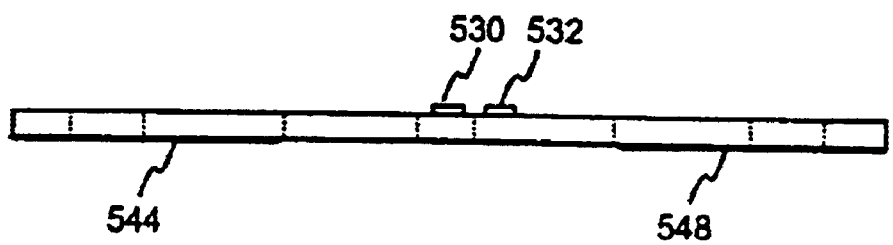

The invention is explained in greater detail below with reference to the accompanying drawings, in which FIG. 1 shows conventional positioning of measuring sensors on the deck of a ship hull, FIG. 2 is a block diagram of a measuring system of the invention, FIG. 3 is a block diagram of a measuring unit of the invention, FIG. 4 is a flow diagram of a procedure of the invention for transmitting measuring data, FIG. 5a is a top view of a measuring sensor of the invention and FIG. 5b is a lateral view of a measuring sensor of the invention.

FIG. 1 has been explained above in connection with the description of prior art.

FIG. 2 is a block diagram of a measuring system of the invention. It comprises a central processing unit 20, which is connected to a digital data communication bus 21. Connected to the data communication bus 21, there is a plurality of measuring units 30, 32 and 34, which are placed at suitable measuring locations in the structure to be measured.

The central processing unit may comprise e.g. a PC-based computer with e.g. an NT operating system. In that case, in a windows NT operating system, a divided memory may act as an open user interface, over which the user has access to the measuring results in the system and can control the system. The data communication bus may preferably be an ARCNET-data network (Attached Resource Computer Network). An ARCNET computer network has the feature of automatic reconfiguration. This feature is preferably utilised by performing an addition and a removal of a measuring sensor/unit without any program modifications or other modifications of the system. Each measuring sensor/unit is identified in the system on the basis of its own individual identifier (e.g. serial number), so that the data are organised to the user interface (data structure) in the divided memory of the Windows NT by the individual identifier. The ARCNET computer network automatically handles the data communication node identifiers in connection with each configuration activation. Hence cross-connection incorporated in the message interpretation of the central processing unit can be automatically organised and connect the data communication node identifier to the individual identifier of the measuring unit. Configuration is consequently not needed as a user operation.

FIG. 3 shows a measuring unit 30 of the invention. It comprises a Wheatstone bridge 302, in which a first strain gauge for measuring deformation and a second strain gauge for temperature compensation are serially connected. Stationary resistors form the second part of the bridge.

A measuring signal obtained from the Wheatstone bridge is amplified with the instrumentation amplifier 304, whose output signal is further filtered with a low pass filter 306. The measuring frequency band is e.g. 0–150 Hz, and the frequency band can preferably be selected by programming. The amplified and filtered analogue signal is converted into a digital signal with an analogue-digital (A/D) converter 308, from where the digital samples obtained are directed to the microprocessor 310. The A/D converter 308 may also be included in the processor 310. The processor 3 10 stores the measuring results in the storage 314 over the internal bus 312 in the measuring unit. This repeatedly programmable storage 314 has a capacity of e.g. 4 kB+32 kB. For instance, a real-time measuring signal covering the last 10 seconds can be stored in the memory. Computing parameters can also be stored in the memory. The data communication interface 316 connected to the bus 312 further communicates with the system bus 21, which transmits data between the central processing unit and the measuring units. The transmission of measuring data from the measuring unit memory 314 to the central processing unit takes place on the basis of commands from the central processing unit and a program stored in the measuring unit. At the request of the central processing unit, the measuring unit can e.g. transmit a 10 second sample history to the central processing unit.

The measuring unit transmits a measurement sample signal to the central processing unit at a sample frequency, which is preferably lower than the sampling frequency of the D/A-converter. The measuring unit can also be configured over the data communication bus. Thus, for instance, it is possible to choose the analysing methods programmed in the measuring unit to be implemented. The measuring unit may also transmit its configuration setting at determined intervals to be checked by the central processing unit. Also, the measurement offset can be calibrated and the data sampling frequency can be set under the control of the central processing unit. The measuring unit also preferably supervises its own operation. Thus, for instance the cycle of signal analysing programs can be supervised in order to prevent overload on the computing capacity of the processor.

The processor 310 comprises preferably an internal permanent ROM memory, which may have a capacity of e.g. 128 kB. The programs relating both to the measuring unit functions and those relating to data communication between the central processing unit and the measuring unit are stored in this ROM. The required signal analysing algorithms are also stored in the ROM, the algorithms being e.g.:

calculation of the signal average, calculation of the effective signal value, expressions of peak values: a positive peak value, a negative peak value and the maximum peak-to-peak value, calculation of zero overflows and average zero overflow frequency, Rainflow classification and calculation of the frequency range spectrum of the signal by the Fast Fournier (FFT) process.

These analysing methods programmed in the processor of the measuring unit are preferably implemented by the m measuring unit in real time.

In addition to the blocks mentioned above, the measuring unit may comprise circuits for generating operating voltages from the supply voltage obtained from the bus (not represented in FIG. 3).

FIG. 4 shows a flow diagram of a procedure 400 in accordance with the invention for transmitting data between a measuring unit and the central processing unit. First, the measuring unit checks whether a message has been received from the central processing unit, step 402. If a message has been received, it is interpreted, 404. Then follows a check whether the measuring unit has received new configuration data, step 406. If new configuration data have been received, the configuration of the measuring unit is reset according to these new data, 408. Next follows a check whether the measuring unit has received a command to transmit the valid configuration data to the central processing unit 410. The command may be e.g. a bit/bit string to this effect in a message addressed by the central processing unit to the measuring unit. The command may also derive from a sensor timer. If such a command has been received, the configuration data are sent to the central processing unit, 412.

Then it is checked whether the measuring unit has received a command to send mathematically calculated measuring data to the central processing unit, step 414. If such a command has been received, the measuring data are transmitted to the central processing unit, 416. After this follows a,check whether the measuring unit has received a command to send signal history to the central processing unit, 418. If such a command has been received, the signal history is sent to the central processing unit, 420. Then it is checked whether the measuring unit has received a command to send a Rainflow classification to the central processing unit, 422. If such a command has been received, the Rainflow classification is sent to the central processing unit, 424. Then it is checked whether the measuring unit has received a command to send FFT results to the central processing unit, 426. If such a command has been received, the FFT results are sent to the central processing unit, 428. Finally follows a check whether the signal sample buffer of the measuring unit contains data, step 430. If the buffer contains data, the data are sent to the central processing unit, 432. In that case, the transmission preferably takes place at a sample frequency lower than the sampling frequency. At the end of these steps, step 402 is resumed, and the steps mentioned above are repeated, so that the measuring data needed for the central processing unit in each case are actually sent to the central processing unit in conformity with the commands of the central processing unit. It should be noted that apart from the central processing unit, the commands mentioned above may consequently derive from the measuring unit timer.

FIGS. 5a and 5b show a measuring sensor 50 of the invention, which is suitable for use i.a. in the measuring unit of the invention. FIG. 5a shows a top view of the measuring sensor and FIG. 5b a side view of the measuring sensor. The measuring sensor comprises a sensor assembly 502 having rigid members 504 and 508 at its ends and an elastic member 506 at its centre. The rigid and elastic members are separated with a broken line in the figure. The rigid member of the sensor assembly has holes 520 and 522 for attachment of the sensor to the structure material to be measured or to mounting members provided in the structure material.

The elastic member 506 of the sensor assembly has two openings 510 and 512 in the shape of an H, i.e. forming a so-called double H opening. With the aid of this opening, the elastic member has been imparted higher elasticity than the rigid member. Between the two H-shaped openings, a first strain gauge sensor 530 has been attached, which, connected e.g. to a Wheatstone bridge, provides a signal proportional to the deformation of the elastic member. In addition, within the second H opening, a second strain gauge sensor 532 has been attached, in whose mounting base no deformation occurs. The purpose of this second strain gauge sensor is to act as a reference resistor of the Wheatstone bridge and to compensate for the resistance changes caused by temperature variations of the sensor in the first strain gauge sensor.

The elastic area of the sensor assembly material (i.e. a limit of elasticity of $\sigma_E$) is preferably selected so as to be larger than that of the structure material, for the structure material deformations to be measured not to cause permanent changes in the elastic area of the sensor assembly. Moreover, the sensor assembly material has been selected so as to resist varying loads without fatigue, in the way the structure material does. The legs in the double H-shape of the sensor assembly are rectangular cross-sectional surfaces, whose length does not exceed the buckling length under compression load when the compression load corresponds to the deformation of the structure material over its entire elastic area ($\sigma_E$).

The sensor is preferably fastened by bolts to mounting members welded to the structure material, so that the measuring sensor can be replaced and calibrated. In fact, the measuring sensor can be mounted as normal precision work. The power transmission from the structure material takes place by means of a frictional joint, the adhesive surfaces of the sensor assembly having been roughened with cobalt carbide coatings 544 and 548. The carbide crystals of the coating penetrate into mating surfaces of the fastening elements welded to the structure material, thus preventing sliding.

When the measuring unit comprises the sensor of the invention and the signal processing electronics of the invention, the unit can be encapsulated preferably with the casing bottom comprising the measuring sensor and the cover part of the casing comprising the signal processing electronics. In addition, the bottom part and the cover part are preferably joined in a way which ensures a water-proof unit. A fixed cable extendable in an appropriate junction box is preferably used in the measuring unit.

A second option is encapsulating the measuring sensor and the signal processing electronics in discrete casings. Such a solution may be advantageous when it is necessary to carry out mounting of the sensor part under explosive circumstances. Such locations are e.g. the inner surfaces of various containers. The measuring electronics is then preferably placed outside the container, for instance.

A number of preferred embodiments of the invention has been described above. The principle of the invention can naturally be varied within the scope of protection defined by the claims with regard to details and fields of application.

It should be especially noted that, besides in the measurement of the loading on a ship hull, the invention can be applied to most varied structures. It should also be noted that the measuring sensor, measuring unit and measuring method and/or system of the invention can also be implemented independently of each other.

What is claimed is:

1. A measuring sensor for measuring loading on a structure, comprising:

a sensor assembly which is configured to be attached to the structure to be measured and comprises two rigid parts configured for attachment to the structure to be measured and an elastic part between the two rigid parts, a first strain gauge attached to the elastic part for transmitting deformations of the structure and the sensor assembly to the strain gauge to generate a signal proportional to the deformations, a second strain gauge for temperature compensation which is attached to a portion of the sensor assembly where no substantial deformations occur.

2. A measuring sensor as defined in claim 1, wherein said first strain gauge and second strain gauge are integrated in a Wheatstone bridge.

3. A measuring sensor as defined in claim 1, wherein said sensor assembly comprises a double-H opening for forming an elastic area and providing a measuring point for said first strain gauge.

4. A measuring sensor as defined in claim 1, wherein an elastic area/limit of elasticity of material of the sensor assembly is selected so as to be higher than an elastic area/limit of elasticity of material of the structure.

5. A measuring sensor as defined in claim 1, wherein surfaces on the rigid parts bearing against the structure or against fastening members provided in the structure have been roughened.

6. A measuring sensor as defined in claim 3, wherein said first strain gauge is attached between two H openings.

7. A measuring sensor as defined in claim 3, wherein the second strain gauge is attached to a central member of the H opening.

\* \* \* \* \*